ROTARY TRANSDUCER RECORDING PARALLEL TO THE DIRECTION OF TAPE MOVEMENT

Filed Sept. 9, 1965

United States Patent Office 3,457,557
Patented July 22, 1969

3,457,557

ROTARY TRANSDUCER RECORDING PARALLEL TO THE DIRECTION OF TAPE MOVEMENT

Owen Storey, Viroflay, France, assignor to Centre National de la Recherche Scientifique, Paris, France, a French Government administration Filed Sept. 9, 1965, Ser. No. 486,134
Claims priority, application France, Sept. 12, 1964, 987,952
Int. Cl. G11b 5/52
U.S. Cl. 340—174.1 11 Claims

ABSTRACT OF THE DISCLOSURE

To record numerical data on a magnetic tape in the form of blocks of data separated by blank intervals, for direct assimilation by a digital computer, the tape is passed at a uniform speed past a drum carrying four groups of recording heads distributed at 90° from one another. This drum is disposed so that the tape remains in contact with it along a little more than a quarter of its lateral surface and is driven in the same direction as the tape, but slower than the tape. The data to be recorded are switched at each instant to the group of heads which is located in contact with the tape.

This invention relates to devices for recording numerical data on magnetic tapes in a form suitable for feeding to apparatus for the treatment of digital information, that is to say in the form of "blocks" of data separated one from another by intervals not provided with data.

The principal object of the invention is to make such devices capable of meeting better than hitherto the various practical requirements, in particular as regards simplification of the electronic part thereof.

The invention consists principally in the provision, in such devices, of means for causing a magnetic tape to move, preferably at a uniform speed, past a system suitable for recording on the tape the numerical data that it receives, said system being constituted by a drum which is cylindrical and rotatable and carries $n$ groups of recording heads uniformly spaced on its periphery, $n$ being a whole number at least equal to 2 and preferably equal to 4, said drum being located in such manner that the tape remains in contact with it along rather more than the $n$th part of its lateral surface, the circumferential speed of said drum having the same sense but being smaller than that of the tape that slides along its lateral surface, means being provided for directing, at each instant, the numerical data to be recorded towards the group of heads that is in contact with the tape, or towards one of the two groups of heads that are in contact with said tape for the brief periods during which the said tape is in contact with two such groups, each group comprising as many heads as the number of elements of numerical information to be recorded simultaneously on the tape, which for this purpose comprises the same number of independent tracks.

In addition to this principal arrangement the invention comprises a particular method of employment (that for which it is applied to the recording of numerical data on magnetic tapes intended for feeding to digital computers), as well as particular practical forms of the said devices; and more particularly it further includes by way of new industrial products devices of the type in question comprising the application of the said arrangements, as well as the elements and apparatus suitable for establishing them and assemblies equipped with similar devices.

Figure 1:
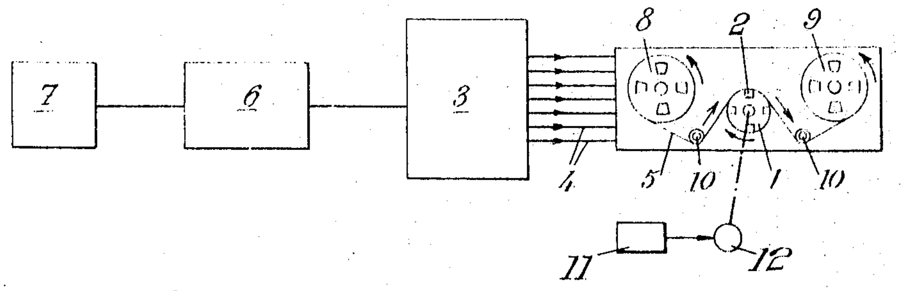
Figures 2, 3, 4, 5, 6:
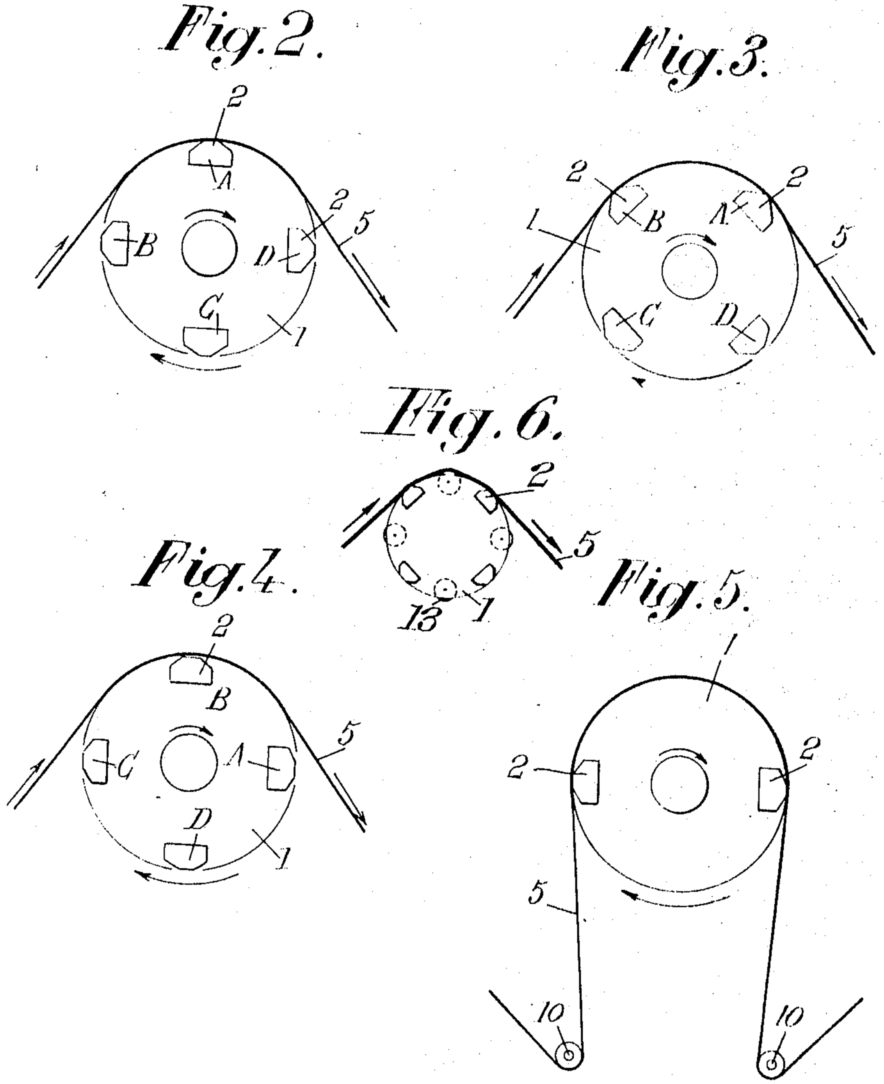

The invention will now be described in more detail with reference to the accompanying drawing, in which:

FIG. 1 shows diagrammatically a digital recording assembly in accordance with the invention, FIGS. 2, 3 and 4 show diagrammatically three different positions occupied successively by the drum of the assembly, FIG. 5 shows diagrammatically a modified form of the drum, and FIG. 6 shows diagrammatically an improved form of the drum.

In accordance with the invention, and more particularly in accordance with that one of its modes of employment and with those practical forms to which it appears that preference should be given, the invention is carried into effect in the following or an analogous manner, making use of an apparatus suitable for providing an uninterrupted sequence of numerical data having a plurality of elements, e.g., figures or "bits," with the object of recording this sequence without gaps on a magnetic tape in a form that can be directly assimilated by a digital computer.

Before reference is made to the drawings, it will be recalled that the capacity of computers to memorise is limited, in such manner that it is not possible to introduce into them by a simple continuous reading all the information inscribed on a complete spool of magnetic tape.

In other words, for direct assimilation by a digital computer the numerical data recorded on the magnetic tape must be presented in the form of "blocks" of data separated one from another by time intervals without data, the duration of each block (which for example is of the order of a thousand successive data) being determined in such manner as not to exceed the memorising capacity of the computer to be fed, and the duration of each interval being determined by the characteristics of the rapid start and stop magnetic tape apparatus utilised in the computer for reading the data. The said interval should be sufficient to enable the said apparatus to stop the tape at the end of the reading of a block of data, and then to start this tape and accelerate it to its nominal speed before the arrival of the first part of the following block.

Now, the numerical data to be recorded are generally available in the form of an uninterrupted train.

To enable all these data to be recorded in the form of separate blocks on the same tape and without omission, use has generally been made of an electronic memory drum unit having two parallel exchangeable tracks which receive alternately the uninterrupted flow of data and are discharged in turn on the tape. The discharge of each track should be effected a little more rapidly than its filling, in such manner that each track may be totally discharged before the other is completely filled and that the time intervals comprised between the successive discharge periods of the two tracks correspond exactly to the spaces that it is desired to leave blank on the tape.

These electronic units are complex and hence delicate and expensive.

By effecting the recording, in accordance with the invention, with the aid of heads mounted on a rotary drum, the above-mentioned defects are avoided since the electronic memory drum becomes unnecessary.

The drum carries $n$ groups of recording heads uniformly spaced on its lateral surface, $n$ being an integer at least equal to two, and the magnetic tape contacts the lateral surface of this drum over a little more than the $n$th part of this surface in such manner that when contact between the tape and one of the groups of heads ceases the following group is already in contact with the tape.

Each group comprises as many heads as the number of "bits" comprised in the data to be recorded and the number of independent tracks that the tape comprises.

The tape slides along the said surface of the drum, moving in the same direction as the said surface but much faster than the surface (for example several dozen times faster) in such manner that between the instant at which a group of heads comes into contact with the tape and the instant at which it loses contact the tape has moved through a length L much greater than the circumferential distance $l$ separating the said group from the following one. Shortly before the instant at which the said group loses the contact referred to, the flow of numerical data to be recorded, which up to then was being transmitted to this group, is transmitted to the following group, which instantly and automatically leaves a blank space of length $l$ on the tape without any discontinuity in the speed of travel of this tape.

In a modified arrangement the flow of data could be switched towards the second group of heads before shifting it from the first, in such manner that some data are doubly recorded at the end of each for continuously directing these signals to the right group of heads.

In the present case, and more generally if the number of groups of heads is even, they may be connected in two assemblies of alternate groups energised in turn, two successive groups of heads of one assembly being separated by one group of the other. In this way the energisation of each group is well interrupted when the following one is energised, and this following one is not energised before the preceding one is de-energised, thereby excluding any risk of double recording of some data when this is not desired.

FIG. 1 also shows the pulleys 10 for guiding and tensioning the tape 5. This figure does not show the means for causing the tape to move at constant speed and for keeping it under tension; these may be the usual capstans and idlers.

The operation of the device described above is as follows.

The four groups of heads 2 on the drum 1 are designated by the letters A, B, C and D, and it is assumed that these groups are connected in pairs (viz. A and C on the one hand, B and D on the other hand).

When the group A alone is in contact with the tape 5 (FIG. 2) the recording is effected on this tape by the said group A.

When this group A comes to the point in its circular path at which the tape 5 commences to leave the drum 1 (FIG. 3) the energisations of the groups A and B are switched over instantaneonsly and, from this instant the sequence of numerical data is recorded on the tape by group B (FIG. 4), and so on. The part of the tape which at the said instant extended between groups A and B therefore remains block and at the start of the following block, such an arrangement being utilisable with the object of ensuring continuity of recording of the data notwithstanding their separation into blocks.

In the following, there will be described in more detail the embodiment shown diagrammatically in FIGS. 1 to 4 in which the drum 1 carries for groups of heads 2, for recording, spaced apart by 90°.

In this embodiment it is assumed for example that the uninterrupted train of numerical data is supplied by a numerical analog converter 3, each of the data being presented in the form of seven voltage pulses which are square positive or negative pulses (or absences of such pulses) each representing a digit in binary numeration (1 or 0) and transmitted respectively on seven parallel electrical tracks 4, each of these signals (pulse or absence of pulse) being capable of energising or leaving unenergised an appropriate sensitive area of a track of a magnetic tape 5, which therefore has seven parallel tracks.

The converter 3 is fed in known manner, for example by the stepped voltage formed by a blocking sampler 6 from the analog voltage which is continuous and is formed by a captor 7 as a function of a given value.

The tape 5 is driven in such manner as to move at a constant speed past the drum 1 from a wind-off spool 8 to a wind-on spool 9, and the drum 1 is driven in such manner that its lateral surface moves at constant speed in the same direction as the tape 5 but much more slowly, the tape therefore moving at constant speed relative to the groups of heads 2 carried by the drum.

The signals coming from the tracks 4 are transmitted to the groups of heads 2, for example through the intermediary of rotary contacts (not shown), and a suitable switching system is provided blank and forms the required separation between the two recorded blocks without interruption either before or after this instant.

At the instant in question, at which the two groups A and B are in contact with the tape, these may be used simultaneously for recording other data, for example with the object of recording with the aid of group B signals indicating the start of a new block whilst the end of the preceding block is recorded with the aid of group A, and/or with the object of recording with the aid of group A signals indicating the end of a block whilst group B records the start of the following block.

As already mentioned, it may in some cases be useful to take advantage of the instant at which the two groups of heads A and B are in contact with the tape for doubly recording a limited number of data.

If it is desired that all the blocks should contain the same number of data, it is convenient to synchronise the switching of the energization of groups of heads together with the rotation of the drum and with the output of the converter 3.

It is not necessary for the unwinding of the tape to be rigorously synchronised with these parameters, but in general this synchronisation is automatic since the tape and the drum are driven by the same motor.

The said synchronisation may be ensured on the basis of the rotation of the drum or on the basis of the output of data from the apparatus 3.

In accordance with the first arrangement, the sampling of the member 6 may be controlled by a train of pulses generated with the aid of a contact actuated periodically by the motor that drives the drum. Such an arrangement could be used in applications in which any variations in the sampling rhythm due to variations in the speed of the motor are not troublesome.

In contrast, in the case in which the said rhythm has to be very uniform and also in the case in which the scanning should be effected at well defined instants, it is preferable to generate the train of sampling pulses with the aid of a stable generator 11 and to use this train to control the rotation of the motor 12, the motor then being selected specially in relation to this purpose.

This second arragement could be envisaged equally well with an irregular sampling rhythm if this is relatively slow.

Of course, if a slight variation in the duration of the blocks is admissable the switching of the groups of heads may be controlled in a manner which is not very precise, for example with the aid of simple electrical contacts actuated by the drum.

In the example described above the speed of travel of the tape is constant, but this is not absolutely necessary. The said tape may be driven intermittently, the intermissions corresponding to each of the data (incremental driving) or to each block of data (drive with rapid starting and stopping).

The number of groups of heads carried by the drum is at least equal to two, as in the modification shown diagrammatically in FIG. 5. This modification permits economy as regards groups of heads, but the length of tape that it leaves blank between two consecutive recorded blocks is relatively large, which leads to a higher consumption of tape than in the other cases. In this case there is moreover observed increased friction due to the sliding of the tape on the drum.

It is to be noted that in some cases it will be desirable, for reducing the friction in question, to mount rollers or pins 13 (FIG. 6) which are freely rotatable about their axes in the vicinity of the lateral surface of the drum, like the bars of a cage, in such manner that the tape passes over these elements with little or no friction.

Solely by way of example, there are given below some figures and orders of magnitude relating to an embodiment of the invention.

Drum diameter (with 4 groups of heads) of the order of 5 cm.,

Speed of rotation of this drum of the order of 1 rotation in 4 seconds,

Constant unwinding speed of tape from 12.5 to 125 cm./s. according to the rhythm of presentation of the data (which varies from 1,000 to 10,000 per second) and the number of data contained in each block (which would vary from 1,000 to 10,000 in the above numerical assumption, at the rate of 80 data recorded per cm. of tape).

It is to be noted that such a recording device with rotating heads is applicable particularly well to the recording of numerical data arriving regularly with a high rhythm.

One of the principal applications of such a device is to data logging, which consists in collecting by regular scanning (for example 10 times per second) the indications furnished by measuring instruments and recording them on magnetic tape with a view to making subsequent use of them.

Such data logging is becoming more and more widely used, both in the scientific field (radio astronomical studies, measurement of variations in the earth's magnetic field, seismographic studies, study of explosions, etc.), and in the technical field (aerodynamic wind-tunnel tests, testing parts in vibration, etc.), and in the industrial field (surveillance of automatic manufacturing processes, etc.).

I claim:

1. A device for recording numerical data which comprises, in combination, a rotary cylindrical drum rotating at a given speed, *n* groups of data recording heads, each of said groups of recording heads consisting of a plurality of individual heads disposed substantially in line across substantially the entire width of the drum, spaced uniformly on the periphery of said drum, *n* being an integer at least equal to two, a magnetic tape running along with the periphery of said drum over only a little more than the *n*th portion thereof, and in any case considerably less than the 2*n*th portion thereof, whereby at least one and at most two groups of data recording heads are in cooperating relation with said tape at any given instant, said magnetic tape being arranged to cooperate with said heads for recording data therefrom, means for running said tape at a speed greater than the circumferential speed of said drum and in the same direction, and feeding means for feeding data signals to the group of data recording heads actually in cooperating relation with said tape, whereby each group of data recording heads records a block of data on said tape, said groups of data recorded across substantially the entire width of the tape, and an unrecorded blank is left on said tape between two successive blocks of data, said unrecorded blanks also being disposed across substantially the entire width of the tape, corresponding to the circumferential separation between the two successive groups of data recording heads simultaneously in cooperating relation with said tape.

2. A device according to claim 1 wherein said means for running said tape is adapted to give it a uniform speed, said drum being adapted to rotate at a uniform speed.

3. A device according to claim 1 wherein said number *n* is equal to four.

4. A device according to claim 1 comprising means for simultaneously recording signals on said tape from two of said groups of recording heads simultaneously in contact with said tape.

5. A device according to claim 1 wherein the rate at which the data signals are fed to said groups of heads is dependent upon the speed of rotation of said drum, and the switching of energizing of said groups of heads is also dependent upon the speed of rotation of said drum.

6. A device according to claim 1 further including a pulse generator, and a motor for driving said drum controlled by said pulse generator, the rate at which the date signals are fed to said groups of heads being controlled by said pulse generator.

7. A device according to claim 1 further comprising freely rotatable rolling means mounted along the cylindrical surface of said drum for reducing the friction of said tape along the periphery of said drum.

8. A device according to claim 1, wherein said feeding means include switch means adapted to switch the feed of data, when two successive groups of data recording heads are simultaneously in cooperating relation with said tape, from the leading group of data recording heads to the trailing group of data recording heads of said two successive groups of data recording heads, the terms "leading" and "trailing" being considered with respect to the direction of rotation of said drum.

9. A device according to claim 8, wherein said switch means are adapted, on switching the feed of data from said leading group of data recording heads to said trailing group of data recording heads, to cut off the feed of data from said leading group of data recording heads at the same instant as said switch means establishes the feed of data to said trailing group of data recording heads, whereby the length of said unrecorded blank is substantially equal to the circumferential distance between said leading and trailing groups of data recording heads.

10. A device according to claim 8, wherein said switch means are adapted, on switching the feed of data from said leading group of data recording heads to said trailing group of data recording heads, to cut off the feed of data to said leading group of heads after said switch means establishes the feed of data to said trailing group of data recording heads, whereby some data are doubly recorded, at the end of the block corresponding to said leading group of data recording heads and at the start of the succeeding block, corresponding to said trailing group of data recording heads.

11. A device according to claim 8, wherein said switch means are adapted, on switching the feed of data from the leading group of data recording heads to the trailing group of data recording heads, to cut off the feed of data to said leading group of data recording heads after said switch means establishes the feed of data to said trailing group of data recording heads, said feeding means being adapted to feed, between the instant of cut off of the feed of data to said leading group of data recording heads and the instant of establishment of the feed of data to said trailing group of data recording heads, signals to at least one of said two successive groups of data recording heads simultaneously in cooperating relation with said tape, for recording said signals on said tape, said signals indicating the switch over of the recorded data from one block to the successive block.

References Cited

UNITED STATES PATENTS

| | | | |
|---|---|---|---|
| 2,903,521 | 9/1959 | Ellison | 179—100.2 |
| 2,886,650 | 5/1959 | Fairbanks et al. | 179—100.2 |

BERNARD KONICK, Primary Examiner

VINCENT P. CANNEY, Assistant Examiner

U.S. Cl. X.R.

179—100.2